United States Patent
Lee (10) Patent No.: US 12,261,450 B2
(45) Date of Patent: Mar. 25, 2025

(54) APPARATUS AND METHOD FOR CONTROLLING WIRELESS CHARGER FOR VEHICLE

(71) Applicants: Hyundai Motor Company, Seoul (KR); Kia Corporation, Seoul (KR)

(72) Inventor: Dong Jun Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 401 days.

(21) Appl. No.: 17/712,475

(22) Filed: Apr. 4, 2022

(65) Prior Publication Data

US 2023/0091299 A1 Mar. 23, 2023

(30) Foreign Application Priority Data

Sep. 23, 2021 (KR) .................. 10-2021-0125830

(51) Int. Cl.
*H02J 50/00* (2016.01)
*F04D 25/08* (2006.01)
*F24F 11/65* (2018.01)

(52) U.S. Cl.
CPC ............ *H02J 50/005* (2020.01); *F24F 11/65* (2018.01); *F04D 25/08* (2013.01)

(58) Field of Classification Search
CPC ...... H02J 50/005; F24F 11/65; F24F 2120/20; F04D 25/08; F04D 27/001; F04D 27/004; F04D 29/582; F04D 29/663; F05D 2270/81; Y02T 10/7072
See application file for complete search history.

(56) References Cited

U.S. PATENT DOCUMENTS

| 2009/0222147 | A1* | 9/2009 | Nakashima | G06F 1/206 |
| | | | | 713/502 |
| 2015/0322844 | A1* | 11/2015 | Kim | F01P 7/14 |
| | | | | 123/41.05 |
| 2022/0235859 | A1* | 7/2022 | Inoue | F01P 7/044 |

FOREIGN PATENT DOCUMENTS

| CN | 112228367 A | * | 1/2021 | |
| KR | 101837399 B1 | * | 3/2018 | ............ B60W 10/08 |

OTHER PUBLICATIONS

Machine Translation of CN112228367A PDF File Name: "CN112228367A_Machine_Translation.pdf".*
Machine Translation of KR101837399B1 PDF File Name: "KR101837399B1_Machine_Translation.pdf".*

* cited by examiner

*Primary Examiner* — Grant Moubry
*Assistant Examiner* — Ruben Picon-Feliciano
(74) *Attorney, Agent, or Firm* — Fox Rothschild LLP (57) ABSTRACT

An apparatus for controlling a wireless charger for a vehicle includes a communication device to receive an input from a user and information on the vehicle, and a controller to employ one of a first driving duty ratio of a cooling fan set based on the information on the vehicle, a second driving duty ratio of the cooling fan set based on the input from the user, or a third driving duty ratio of the cooling fan set through auto-tuning operation to operate the cooling fan, to enhance charging performance of the wireless charger while minimizing the feeling of the user bothered due to operating noise of a cooling fan.

16 Claims, 6 Drawing Sheets

FIG.1

| ENGINE TYPE | FIRST CONDITION (FIRST SPEED OR LESS AND VEHICLE ENGINE STOP) | SECOND CONDITION (MORE THAN FIRST SPEED, AND VEHICLE ENGINE RUN) | THIRD CONDITION (SECOND SPEED OR MORE, AND VEHICLE ENGINE RUN) | REMARKS |
|---|---|---|---|---|
| ENGINE TYPE ELECTRICITY | | 20% | | UNCONDITIONALLY APPLIED REGARDLESS OF SPEED |
| GASOLINE | 20% | 40% | 70% | |
| DIESEL | 20% | 50% | 80% | EXCESSIVE ENGINE NOISE CONSIDERED |

APPARATUS AND METHOD FOR CONTROLLING WIRELESS CHARGER FOR VEHICLE

CROSS-REFERENCE TO RELATED APPLICATION

This application claims under 35 U.S.C. § 119 (a) the benefit of Korean Patent Application No. 10-2021-0125830, filed in the Korean Intellectual Property Office on Sep. 23, 2021, the entire contents of which are incorporated herein by reference.

BACKGROUND

(a) Technical Field

The present disclosure relates to an apparatus and a method for controlling a wireless charger for a vehicle.

(b) Description of the Related Art

An apparatus for controlling a wireless charger for a vehicle refers to an apparatus to supply power to a battery, which is embedded in a portable electronic device, in wireless inside the vehicle. The wirelessly charging operation may emit heat due to the characteristic of a charging manner, and the heat emitted may degrade charging performance. Accordingly, a cooling fan may be mounted on a rear surface of the wireless charger, and operated to reduce heat emitted from the wireless charger.

When the cooling fan is operated, the heat emitted from the wireless charger may be reduced to enhance the charging performance. However, a user may feel bothered due to operating noise (noise generated by the cooling fan when the cooling fan is operated) of the cooling fan. Accordingly, there is suggested a manner of operating the cooling fan at a duty ratio set depending on a vehicle speed, such that the operating noise of the cooling fan is cancelled from noise (vehicle speed noise) generated as a vehicle speed is increased.

However, the vehicle speed noise is varied depending on the type of the vehicle. Accordingly, when the cooling fan is unconditionally operated at the duty ratio set depending on the vehicle speed, the operating noise of the cooling fan is not canceled from the vehicle speed noise, thereby causing the user to feel bothered. In addition, the cooling fan has a limitation in effectively enhancing the charging performance.

SUMMARY

An aspect of the present disclosure provides an apparatus and a method for controlling a wireless charger for a vehicle, capable of enhancing charging performance of the wireless charger while minimizing the feeling of the user bothered due to operating noise of a cooling fan.

The technical problems to be solved by the present disclosure are not limited to the aforementioned problems, and any other technical problems not mentioned herein will be clearly understood from the following description by those skilled in the art to which the present disclosure pertains.

According to an embodiment of the present disclosure, an apparatus for controlling a wireless charger for a vehicle may include a communication device to receive an input from a user and information on the vehicle, and a controller to employ one of a first driving duty ratio of a cooling fan set based on the information on the vehicle, a second driving duty ratio of the cooling fan set based on the input from the user, or a third driving duty ratio of the cooling fan set through an auto-tuning operation, to operate the cooling fan.

The controller may set the first driving duty ratio depending on an engine type of the vehicle and a vehicle speed, based on noise generated depending on the engine type of the vehicle and the vehicle speed, when receiving the information on the vehicle, and may employ the first driving duty ratio to operate the cooling fan.

The controller may set a second driving duty ratio by changing the first driving duty ratio, based on the input from the user, when receiving the input from the user, and may employ the second driving duty ratio to operate the cooling fan.

The controller may measure noise changed through the auto-tuning operation for the first driving duty ratio, when the second driving duty ratio is not set, may set, as the third driving duty ratio, a driving duty ratio obtained at a time point at which the level of the noise becomes a preset reference noise level, and may employ the third driving duty ratio to operate the cooling fan.

The controller may measure noise changed depending on the auto-tuning operation for the driving duty ratio of the cooling fan, when the vehicle is in a remote starting state, and may collect noise data changed depending on the auto-tuning operation for the driving duty ratio of the cooling fan, when the vehicle is in a remote starting state.

The controller may generate a message for requesting a user response, which is associated with whether to employ the driving duty ratio of the cooling fan obtained at the time point at which a level of the noise becomes a preset reference noise level to operate the cooling fan, when the vehicle is actually started after the vehicle is in the remote starting state.

The controller may set, to the third driving duty ratio, the driving duty ratio of the cooling fan, which is obtained at the time point at which the level of the noise becomes the preset reference noise level, when receiving the user response to allow the driving duty ratio of the cooling fan, which is obtained at the time point at which the level of the noise becomes the preset reference noise level, to operate the cooling fan, and employ the third driving duty ratio to operate the cooling fan.

The controller may employ the first driving duty ratio to operate the cooling fan, when receiving a user response to prevent to the driving duty ratio of the cooling fan, which is obtained at the time point at which the level of the noise becomes the preset reference noise level, from being employed to operate the cooling fan.

The controller may operate the cooling fan to dissipate heat emitted from a wireless charging pad.

According to an embodiment of the present disclosure, a method for controlling a wireless charger for a vehicle may include receiving an input from a user and information on the vehicle, and employing one of a first driving duty ratio of a cooling fan set based on the information on the vehicle, a second driving duty ratio of the cooling fan set based on he input from the user, or a third driving duty ratio of the cooling fan set through auto-tuning operation to operate the cooling fan.

The first driving duty ratio may be set depending on an engine type of the vehicle and a vehicle speed, based on noise caused depending on the engine type of the vehicle and the vehicle speed, when receiving information on the vehicle, and the first driving duty ratio may be applied to the cooling fan.

A second driving duty ratio may be set by changing the first driving duty ratio, based on the input from the user, when the input from the user is received, and the second driving duty ratio may be employed to operate the cooling fan.

Noise changed through the auto-tuning operation for the first driving duty ratio may be measured, when the second driving duty ratio is not set, a driving duty ratio obtained at a time point at which the noise becomes a preset reference noise level may be set as the third driving duty ratio, and the third driving duty ratio may be applied to operate the cooling fan.

Noise changed depending on the auto-tuning operation for the driving duty ratio of the cooling fan may be measured, when the vehicle is in the remote starting state, and noise data changed depending on the auto-tuning operation for the driving duty ratio of the cooling fan may be collected, when the vehicle is in the remote starting state.

A message for requesting a user response, which is associated with whether to employ the driving duty ratio of the cooling fan at the time point at which the noise becomes a preset reference noise level to operate the cooling fan, may be generated when the vehicle is actually started after the remote starting state.

The driving duty ratio of the cooling fan at the time point at which the level of the noise becomes the preset reference noise level, may be set as the third driving duty ratio, when receiving the user response to allow the driving duty ratio of the cooling fan, which is obtained at the time point at which the level of the noise becomes the preset reference noise level, to operate the cooling fan.

The first driving duty ratio may be set to operate the cooling fan, when receiving a user response to prevent to the driving duty ratio of the cooling fan, which is obtained at the time point at which the level of the noise becomes the preset reference noise level, from being employed to operate the cooling fan.

The cooling fan may be operated to dissipate heat emitted from a wireless charging pad.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In addition, in the following description of components according to an embodiment of the present disclosure, the terms 'first', 'second', 'A', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
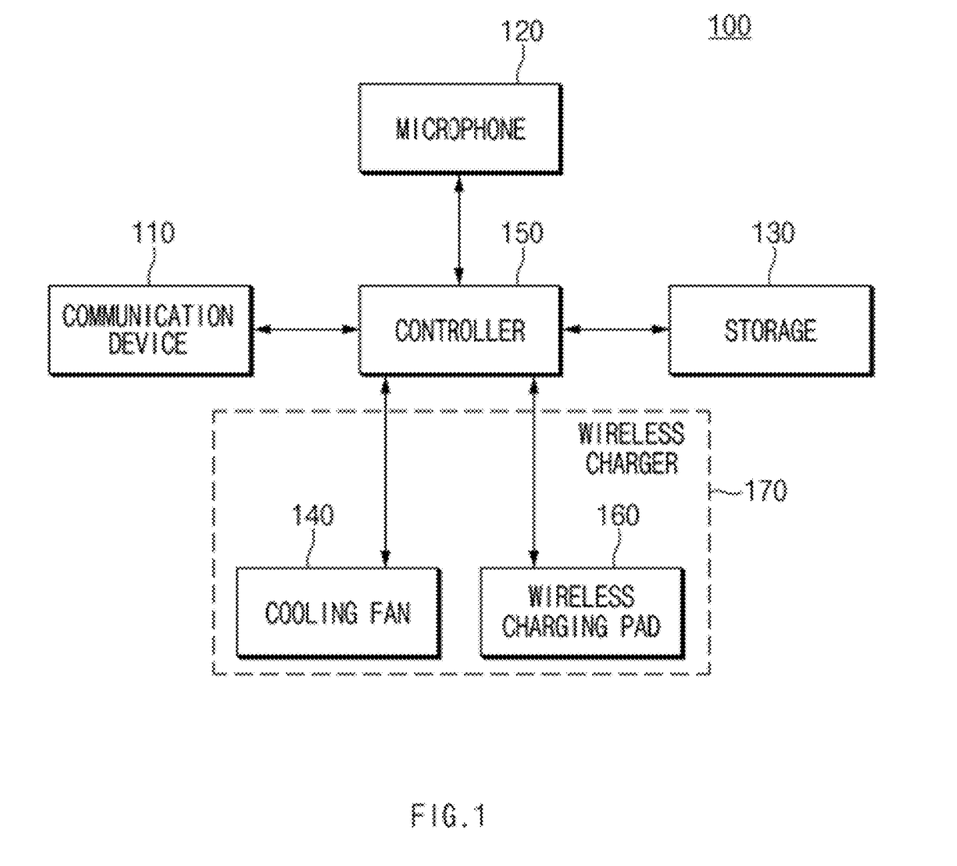
FIG. 1 is a block diagram illustrating the structure of an apparatus for controlling a wireless charger for a vehicle according to an embodiment of the present disclosure.

FIG. 1 is a block diagram illustrating the structure of an apparatus for controlling a wireless charger 170 for a vehicle, according to an embodiment of the present disclosure.

As illustrated in FIG. 1, the apparatus for controlling the wireless charger 170 for the vehicle 100 may include a communication device 110, a microphone 120, a storage 130, a cooling fan 140, a controller 150, and a wireless charging pad 160.

The communication device 110 may communicate with an electronic device provided in the vehicle. For example, the communication device 110 may make CAN communication with a vehicle controller unit (VCU) or an electronic engine management system (EMS) of the vehicle, and may receive the information on the vehicle, through the CAN communication. In this case, the information on the vehicle may include the information on an engine type of the vehicle and information on a speed of the vehicle. According to an embodiment, the engine type may include an electric engine, a gasoline engine, and a diesel engine.

In addition, the communication device 110 may make CAN communication with an audio video navigation (AVN) of the vehicle, and may receive an input from a user through the CAN communication. In this case, the AVN of the vehicle may include an input device and an output device which are separately provided.

For reference, the input device may receive the input from the user. The input from the user may include a driving duty ratio of the cooling fan 140, which is set depending on an extent that the user recognizes noise. According to an embodiment, the input device may receive input information corresponding to the manipulation, the operation, or the voice of the user. According to an embodiment of the present disclosure, the input device may be implemented with a scroll wheel, a button, a knob, a touch screen, a touch pad, a lever, or a track ball, which may be manipulated of a driver, or may be implemented with at least one of a motion sensor or a voice recognizing sensor to sense the motion of the driver or the voice of the driver, or the combination thereof. The output device may receive a message generated depending on the control of the controller 150 and output the message.

The microphone 120 may be provided in the vehicle to measure noise generated from an inner part of the vehicle. According to an embodiment, the microphone 120 may measure operating noise of the cooling fan 140, and may measure starting noise (noise generated when an ignition of the vehicle is turned on) of the vehicle and the noise of an occupant, as well as the operating noise of the cooling fan 140. The microphone 120 may transmit the measured noise to the controller 150 through a local interconnect network (LIN). According to the present disclosure, the microphone 120 is merely an embodiment of a device to measure noise generated from the inner part of the vehicle. The microphone 120 may be substituted with another device (for example, a sensor), as long as the another device measures the operating noise of the cooling fan 140.

The storage 130 may store at least one algorithm to execute the computation of various instructions for the operation of the apparatus for controlling the wireless charger 170 for the vehicle according to an embodiment of the present disclosure. The storage 130 may include at least one storage medium of at least one a flash memory, a hard disk, a memory card, a read-only memory (ROM), a random access memory (RAM), an electrically erasable programmable read-only memory (PROM), a magnetic memory, a magnetic disk, or an optical disk. In addition, the storage 130 may store the driving duty ratio set by the controller 150 and applied to the cooling fan 140.

The cooling fan 140 may be operated to dissipate heat emitted from the wireless charging pad 160 to supply power to a battery of a portable electronic device (for example, a smartphone, a smart pad, or a laptop computer), such that the battery is charged with power. According to an embodiment of the present disclosure, the cooling fan 140 may be provided on a rear surface of the wireless charging pad 160. According to an embodiment of the present disclosure, the cooling fan 140 may be operated, as any one of a first driving duty ratio, a second driving duty ratio, or a third driving duty ratio, which are set by the controller 150, is applied to the cooling fan 140. In this case, the duty ratio may refer to the ratio between a high signal and a low signal for one period of a signal applied to operate the cooling fan 140, and may be determined depending on the proportion of the high signal.

The controller 150 may be implemented by various processing devices, such as a microprocessor embedded therein with a semiconductor chip to operate or execute various instructions, and may control the overall operation of the apparatus for controlling the wireless charger 170 for the vehicle 100, according to an embodiment of the present disclosure. In particular, the controller 150 may employ any one of the first driving duty ratio of the cooling fan 140, which is set based on the information on the vehicle 100, the second driving duty ratio of the cooling fan 140, which is set based on the input from the user, or the third driving duty ratio of the cooling fan 140, which is set through an auto-tuning operation, to operate the cooling fan 140. In other words, the first driving duty ratio may refer to a driving duty ratio of the cooling fan 140, which is set based on the information (noise (the noise of the cooling fan 140, vehicle noise, or user noise) generated in the vehicle) on the vehicle 100. The second driving duty ratio may refer to a duty ratio obtained by changing the first driving duty ratio based on the input from the user. The third driving duty ratio may be a driving duty ratio obtained through an auto-tuning operation based on a reference noise level (a noise level allowed by the user) set under various conditions (conditions based on the engine type of the vehicle and the vehicle speed).

First, hereinafter, the operation of the controller 150 to set the first driving duty ratio of the cooling fan 140 will be described in more detail with reference to FIG. 2.

Figure 2:
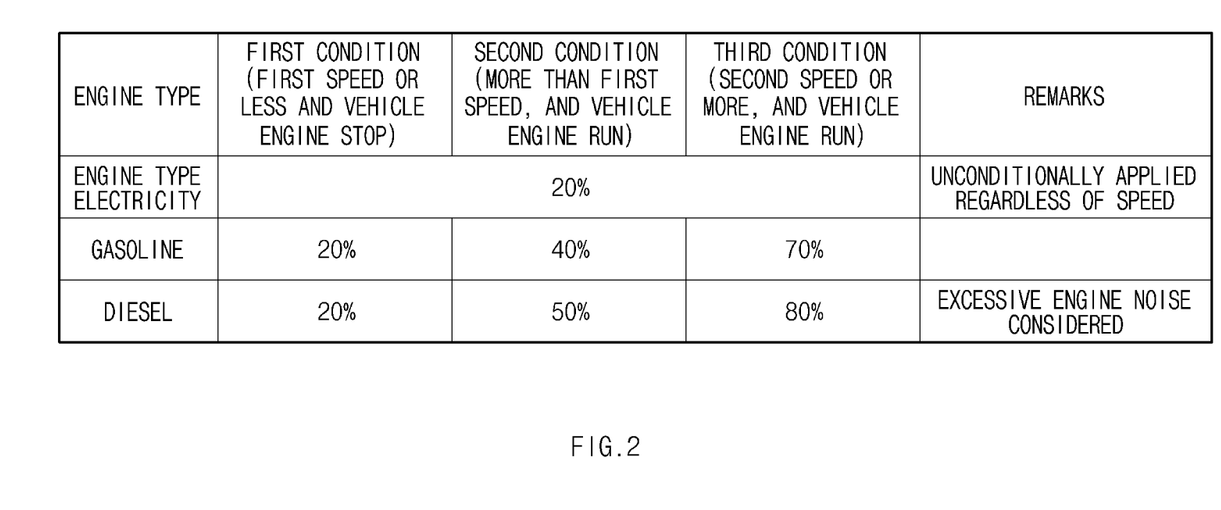
FIG. 2 is a view illustrating a driving duty ratio of the cooling fan of the wireless charger, which is set depending on a vehicle type according to the present disclosure.

FIG. 2 is a view illustrating a driving duty ratio of the cooling fan 140 of the wireless charger 170, which is set depending on a vehicle type according to the present disclosure.

As illustrated in FIG. 2, the controller 150 may receive the information on the vehicle 100 from the vehicle 100, and may set the first driving duty ratio based on the information of the vehicle 100, that is, based on the engine type of the vehicle 100 and the vehicle speed. As the driving duty ratio of the cooling fan 140, heat emitted from the wireless pad is more dissipated, thereby enhancing the charging performance. Accordingly, the controller 150 may set the first driving duty ratio, based on the level of a noise generated from the vehicle 100 depending on the engine type of the vehicle 100 and the vehicle speed, such that the wireless charger 170 has the maximum charging performance.

According to an embodiment, the controller 150 may classify engines of the vehicle 100 into an electric engine, a gasoline engine, and a diesel engine depending on the level of noise generated, and the conditions may be classified into a first condition, a second condition, and a third condition, depending on the vehicle speed. In this case, the first condition may include a case in which a vehicle speed is equal to or less than a first speed (for example, 10 km/h) and an engine is stopped. The second condition may include a case in which a vehicle speed exceeds the first speed (for example, 10 km/h) and an engine is running. The third condition may include a case in which a vehicle speed exceeds a second speed (for example, 55 km/h), and an engine is running.

Accordingly, the first driving duty ratio may include a driving duty ratio set under the first condition, the second condition, and the third condition, depending on the engine type of the vehicle 100.

According to an embodiment, the controller 150 may employ equal driving duty ratios under all conditions of the first condition, the second condition, and the third condition, when the engine type is the electric engine. The level of the noise generated is not largely changed depending on the vehicle speed, when the engine type is the electric engine. Accordingly, an equal driving duty ratio (for example, 20%) may be set under the first condition, the second condition, and the third condition.

According to another embodiment, the controller 150 may set the driving duty ratio of the cooling fan 140 to 40% under the second condition, and may increase the driving duty ratio of the cooling fan 140 to 70% under the third condition, because the vehicle speed noise is increased, toward the third condition from the first condition and even the great noise generated from the cooling fan 140 is canceled, when the engine type is the gasoline engine and the diesel engine.

In addition, when the engine type is the diesel engine, the controller 150 may more increase the driving duty ratio of the cooling fan 140, as compared to that under each condition of the gasoline engine, because vehicle noise is more increased than that of the gasoline engine. Accordingly, the controller 150 may set the driving duty ratio of the cooling fan 140 to 50% under the second condition of the diesel engine, and may set the driving duty ratio of the cooling fan 140 to 80% under the third condition.

In addition, when the first driving duty ratio is set depending on the engine type of the vehicle 100 and the vehicle speed, the controller 150 may employ the first driving duty ratio for each condition of the first condition, the second condition, and the third condition to operate the cooling fan 140, when each condition of the first condition, the second condition, and the third condition is satisfied.

The controller 150 may set the second driving duty ratio of the cooling fan 140, based on the input from the user. In this case, the input from the user may include a driving duty ratio set based on a noise limit allowed by the user.

The controller 150 may receive the input from the user through the communication device 110 inside the vehicle 100, and may set the second driving duty ratio by changing the first driving duty ratio based on the input from the user. The controller 150 may employ the second driving duty ratio to operate the cooling fan 140, when the second driving duty ratio is set as the input from the user is received.

The controller 150 may set the third driving duty ratio through the auto-tuning operation, when the second driving duty ratio is not set. According to an embodiment of the present disclosure, the details of the auto-tuning manner will be described with reference to FIG. 3.

Figure 3:
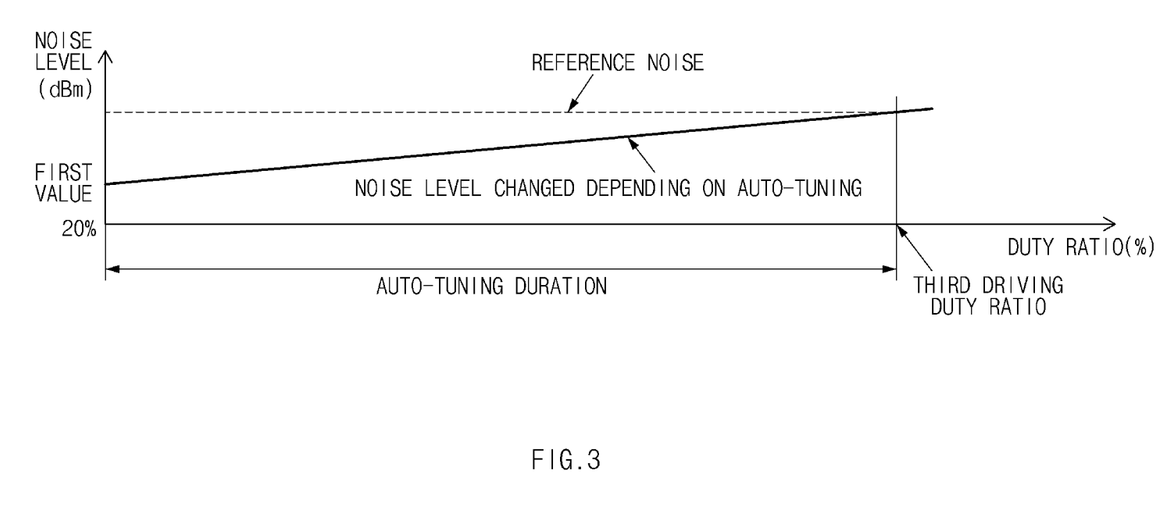
FIG. 3 is a graph illustrating an auto-tuning manner, according to an embodiment of the present disclosure.

FIG. 3 is a graph illustrating an auto-tuning manner, according to an embodiment of the present disclosure.

As illustrated in FIG. 3, the controller 150 may set a noise level, which is allowed by the user, to a reference noise level, and may set, as the third driving duty ratio, a driving duty ratio obtained at the time point at which a noise level changed through the auto-tuning operation for the first driving duty ratio becomes the reference noise level.

According to an embodiment, the controller 150 may perform the auto-tuning operation by increasing the driving duty ratio (20%), which is set under the first condition, by a specific duty ratio (for example, 5%) with respect to each engine type of the vehicle 100 of FIG. 2. In other words, the controller 150 may perform the auto-tuning operation for the duty ratio under the first condition by increasing the driving duty ratio to 25%, 30%, and 35%.

In addition, the controller 150 may measure the noise level at each time point at which the driving duty ratio is increased through the auto-tuning operation. The noise resulting from the auto-tuning operation may be preferably understood as noise generated when the cooling fan 140 is operated at the driving duty ratio obtained through the auto-tuning operation. In this case, the noise resulting from the auto-tuning operation may include starting noise of the vehicle 100, and noise generated by the user getting on the vehicle 100. In general, the noise resulting from the auto-tuning operation is increased as the driving duty ratio is increased, as illustrated in FIG. 3.

When determining that the measured level of noise reaches the reference noise level, the controller 150 may obtain the driving duty ratio at a time point at which the measured level of the noise reaches the reference noise level. The controller 150 may set the obtained driving duty ratio to the third driving duty ratio.

When the third driving duty ratio is set, the controller 150 may change a driving duty ratio, which is preset under the first condition, to the third driving duty ratio, with respect to each engine type. In other words, the controller 150 may apply the third driving duty ratio to a driving duty ratio under the first condition with respect to the engine type of the vehicle 100.

The controller 150 may employ the third driving duty ratio to operate the cooling fan 140, when the driving duty ratio under the first condition is set to the third driving duty ratio through the auto-tuning operation with respect to each engine type of the vehicle 100.

The above description has been made regarding an auto-tuning operation for the driving duty ratio under the first condition with respect to each engine type of the vehicle 100. The operation may be identically applied to the second condition and the third condition with respect to each engine type of the vehicle 100. The controller 150 may set the third driving duty ratio by performing the auto-tuning operation for the driving duty ratio under the first condition, the second condition, and the third condition with respect to each engine type of the vehicle 100.

The controller 150 may measure and collect the level of noise resulting from the auto-tuning operation after performing the auto-tuning operation, in the state (remote starting state) that the vehicle 100 is remotely started, to minimize the noise from the user of the vehicle 100, when measuring noise resulting from the auto-tuning operation for the first driving duty ratio. The collected data may be stored in the storage 130. In this case, the remote starting state may refer to the state in which the user does not get on the vehicle 100 and the vehicle 100 is started, and the state in which the vehicle 100 is not able to travel. The remote starting state may be maintained for a specific time.

According to an embodiment of the present disclosure, the controller 150 may perform the auto-tuning operation for the driving duty ratio in the remote starting state, and may measure and collect noise from the auto-tuning operation, thereby measuring and collecting only starting noise of the vehicle 100 and operating noise of the cooling fan 140 having the driving duty ratio obtained through the auto-tuning operation without the noise from the user.

The controller 150 may easily obtain noise data resulting from the vehicle aging, because the user measures and collects the noise, in the state that the user does not get on the vehicle 100. Therefore, the controller 150 may set reference noise again based on the noise from the vehicle aging and may perform the auto-tuning operation for the driving duty ratio of the cooling fan 140. Accordingly, the controller 150 may consecutively update the driving duty ratio, depending on the state (aging state) of the vehicle 100.

The controller 150 may determine whether the noise from the auto-tuning operation reaches the reference noise level, in a main starting state after the remote starting sate. In this case, the main starting state may refer to the state in which the user gets on the vehicle 100 in the remote starting state, and may refer to the state in which the vehicle 100 is able to travel.

The controller 150 may generate a message for requesting a response of the user, which is associated with whether to employ the driving duty ratio of the cooling fan 140, which is obtained at the time point at which the noise becomes a preset reference noise level, to operate the cooling fan 140, when determining that the measured level of the noise becomes the reference noise level.

According to an embodiment, the controller 150 may transmit the message to the AVN of the vehicle 100, when generating the message. When the user responds to the request through the AVN of the vehicle 100, the controller 150 may receive the response of the user from the vehicle 100.

The controller 150 may set, as the third driving duty ratio, the driving duty ratio of the cooling fan 140, which is obtained at the time point at which the level of the noise becomes the preset reference noise level, and employ the third driving duty ratio to operate the cooling fan 140, when the response of the user indicates the agreement to that the driving duty ratio of the cooling fan 140, which is obtained at the time point at which the level of the noise becomes the preset reference noise level, is employed to operate the cooling fan 140.

The controller 150 may employ the first driving duty ratio to operate the cooling fan 140, when the response of the user does not indicate the agreement to that the driving duty ratio of the cooling fan 140, which is obtained at the time point at which the level of the noise becomes the preset reference noise level, is employed to operate the cooling fan 140. In other words, the controller 150 may employ the first driving duty ratio, which is not auto-tuned, to operate the cooling fan 140.

Figure 4:
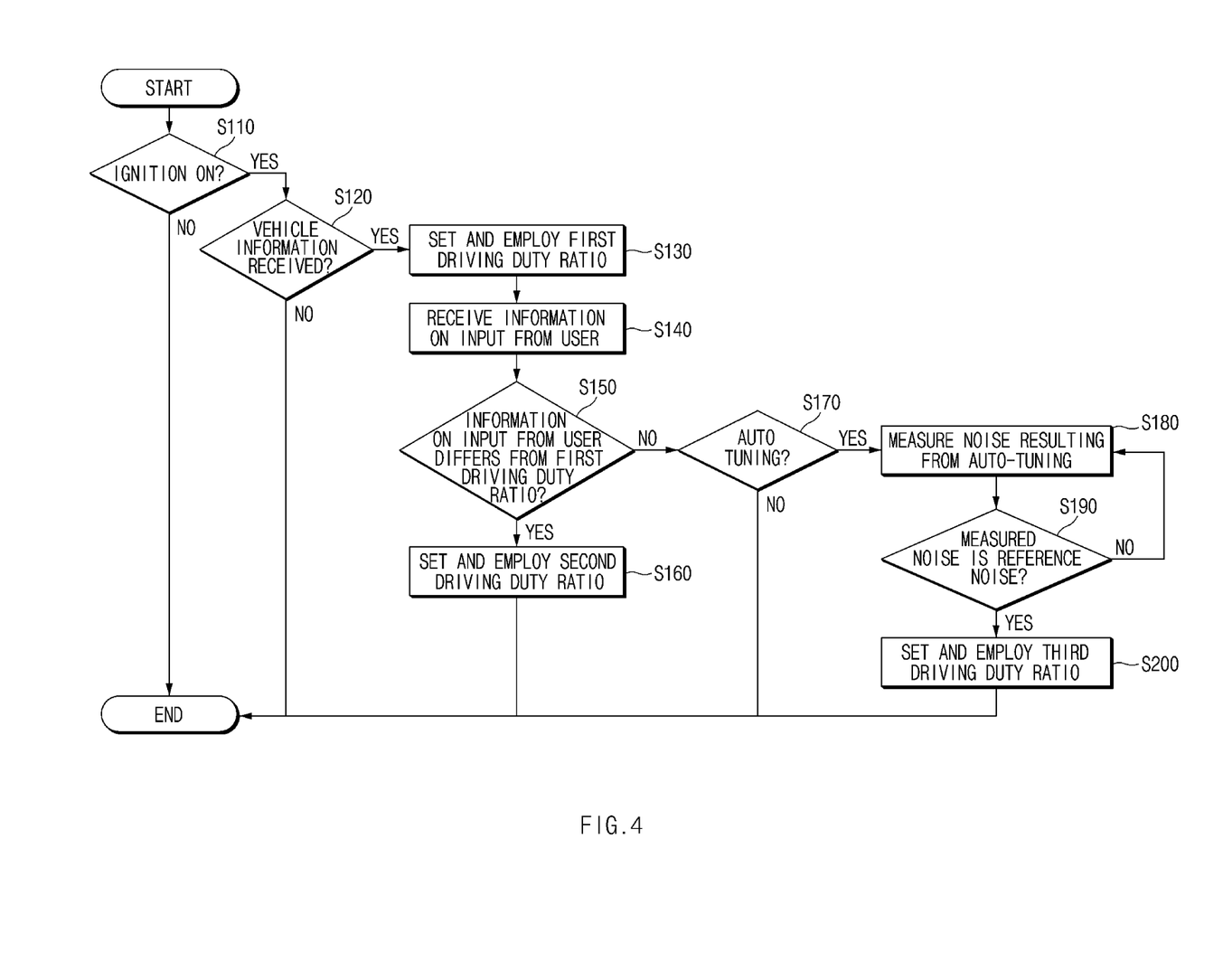
FIG. 4 is a flowchart illustrating a method for controlling a wireless charger for a vehicle, according to an embodiment of the present disclosure.

FIG. 4 is a flowchart illustrating a method for controlling the wireless charger 170 for the vehicle 100, according to an embodiment of the present disclosure.

As illustrated in FIG. 4, the controller 150 may determine whether an ignition of the vehicle 100 is turned on (S110). In S110, the controller 150 may determine whether the information on the vehicle 100 is received, when the ignition of the vehicle 100 is turned on (S120; "YES"). In this case, the information on the vehicle 100 may include the information on an engine type of the vehicle 100 and information on the vehicle speed. In S110, the controller 150 may terminate the operation thereof when the ignition of the vehicle 100 is not turned on ("NO").

When the information on the vehicle 100 is received ("YES") in S120, the controller 150 may set the first driving duty ratio depending on the engine type of the vehicle 100 and the vehicle speed, and may employ the first driving duty ratio to operate the cooling fan 140 (S130). Accordingly, the controller 150 may set the first driving duty ratio, based on the level of a noise generated from the vehicle 100 depending on the engine type of the vehicle 100 and the vehicle speed, such that the wireless charger 170 has the maximum charging performance, in S130. According to an embodiment, the controller 150 may classify engines of the vehicle 100 into an electric engine, a gasoline engine, and a diesel engine, and the vehicle speed may be classified into those under a first condition, a second condition, and a third condition, thereby setting the first driving duty ratio under a condition for each engine type. Accordingly, the first driving duty ratio may include a driving duty ratio set under the first condition, the second condition, and the third condition, depending on the engine type of the vehicle 100. The details thereof may be understood by making reference to the description of FIG. 2. Meanwhile, the controller 150 may terminate the operation thereof, when the information on the vehicle 100 is not received ("No") in S120.

When the input from the user through the AVN of the vehicle 100 is present, the controller 150 may receive the information on the input from the user (S140). In this case, the input from the user may include a driving duty ratio set based on a noise limit allowed by the user.

The controller 150 may determine whether the input from the user is different from the first driving duty ratio (S150). In other words, in S150, the controller 150 may determine whether the user inputs a driving duty ratio different from the first driving duty ratio to change the first driving duty ratio.

When the input from the user is determined as being different from the first driving duty ratio ("YES") in S150, the controller 150 may set the second driving duty ratio by changing the first driving duty ratio based on the input from the user, and may employ the second driving duty ratio to operate the cooling fan 140 (S160).

To the contrary, when the input from the user is not determined as being different from the first driving duty ratio ("NO") in S150, the controller 150 may determine that the user wants to maintain the first driving duty ratio without changing the first driving duty ratio.

The controller 150 may determine whether the auto-tuning operation is performed, when determining that the user wants to maintain the first driving duty ratio without changing the first driving duty ratio (S170). In S170, the controller 150 may determine whether an auto-tuning operation is performed to increase a specific duty ratio from the first driving duty ratio.

When determining that the auto-tuning operation is performed ("YES") in S170, the controller 150 may measure noise from the auto-tuning operation (S180). In S180, the controller 150 may measure the level of operating noise of the cooling fan 140 having the driving duty ratio increased through the auto-tuning operation. The noise resulting from the auto-tuning operation may include, as the operating noise of the cooling fan, starting noise of the vehicle 100, and noise generated by the user getting on the vehicle 100. Meanwhile, the controller 150 may terminate the operation thereof, when determining that the auto-tuning operation is not performed ("NO") in S170.

The controller 150 may determine whether the level of the noise measured in S180 reaches the reference noise level (S190). When determining that the level of the noise measured reaches the reference noise level in S190, the controller 150 may obtain a driving duty ratio at the time point at which the measured level of the noise reaches the reference noise level, and may set the obtained driving duty ratio to the third driving duty ratio (S200). In addition, in S200, the controller 150 may employ the third driving duty ratio to operate the cooling fan.

When determining that the level of the noise measured does not reach the reference noise level ("NO") in S190, the controller 150 may repeatedly perform the auto-tuning operation for the driving duty ratio until the level of the measured noise reaches the reference noise level, and an operation of measuring the noise resulting from the auto-tuning operation.

Figure 5:
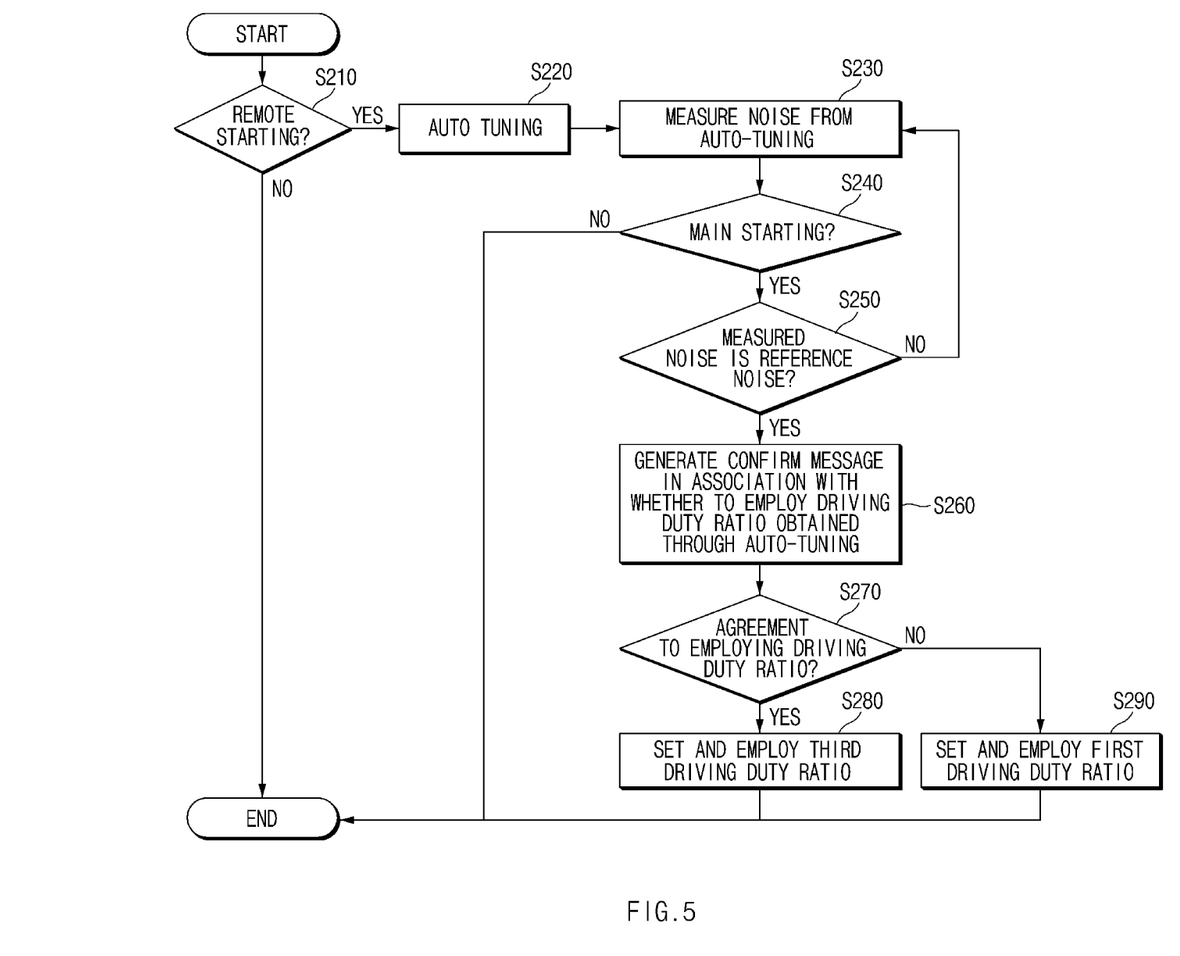
FIG. 5 is a flowchart illustrating a method for controlling a wireless charger for a vehicle, according to an embodiment of the present disclosure.

FIG. 5 is a flowchart illustrating a method for controlling the wireless charger 170 for the vehicle 100, according to an embodiment of the present disclosure.

As illustrated in FIG. 5, the controller 150 may determine whether the vehicle 100 is in a remote starting state (S210). In S210, the remote starting state may refer to the state in which the user does not get on the vehicle 100 and the vehicle 100 is started, and the state in which the vehicle 100 is not able to travel.

When determining that the vehicle 100 is in the remote starting state ("YES") in S210, the controller 150 may perform an auto-tuning operation (S220). In S220, the controller 150 may perform the auto-tuning operation for the first driving duty ratio by increasing the first driving duty ratio by a specific duty ratio.

The controller 150 may measure and collect noise resulting from the auto-tuning operation. The controller 150 may perform the auto-tuning operation in the remote starting state. Accordingly, the noise from the auto-tuning operation may include starting noise of the vehicle 100 and operating noise of the cooling fan 140 having the driving duty ratio obtained through the auto-tuning operation without the noise from the user getting on the vehicle 100.

In S230, the controller 150 may easily obtain noise data resulting from the vehicle aging, because the user measures and collects the noise, in the state that the user does not get on the vehicle 100. Therefore, the controller 150 may set reference noise again based on the noise from the vehicle aging and may perform the auto-tuning operation for the driving duty ratio of the cooling fan 140. Accordingly, the controller 150 may consecutively update the driving duty ratio, depending on the state (aging state) of the vehicle 100.

The controller 150 may determine whether a main starting state comes after the remote starting sate (S240). In this case, the main starting state in S240 may refer to the state in which the user gets on the vehicle 100 in the remote starting state, and may refer to the state in which the vehicle 100 is able to travel.

The controller 150 may determine whether the noise measured in S230 reaches the reference noise level (S250), when determining that the main starting state comes after the remote starting sate ("YES").

The controller 150 may generate a message for requesting a response of the user, which is associated with whether to employ the driving duty ratio, which is obtained at the time point at which the level of the noise becomes a preset reference noise level, to operate the cooling fan 140 (S260), when determining that the measured level of the noise becomes the reference noise level ("YES") in S250.

According to an embodiment, the controller 150 may transmit the message to the AVN of the vehicle 100, when generating the message in S260. When the user responds to the request through the AVN of the vehicle 100, the controller 150 may receive the response of the user from the vehicle 100.

The controller 150 may determine whether the response of the user indicates the agreement to that the driving duty ratio of the cooling fan 140, which is obtained at the time point at which the level of the noise becomes the preset reference noise level, is employed to operate the cooling fan 140 (S270). The controller 150 may set, as the third driving duty ratio, the driving duty ratio, which is obtained at the time point at which the level of the noise becomes the preset reference noise level, and employ the third driving duty ratio to operate the cooling fan 140 (S280), when the response of the user indicates the agreement to that the driving duty ratio is employed to operate the cooling fan 140 ("YES") in S270.

The controller 150 may employ the first driving duty ratio to operate the cooling fan 140 (S290), when the response of the user does not indicate the agreement to that the driving duty ratio of the cooling fan 140, which is obtained at the time point at which the level of the noise becomes the preset reference noise level, is employed to operate the cooling fan 140 ("NO") in S270. In other words, the controller 150 may employ the first driving duty ratio, which is not auto-tuned, to operate the cooling fan 140.

Figure 6:
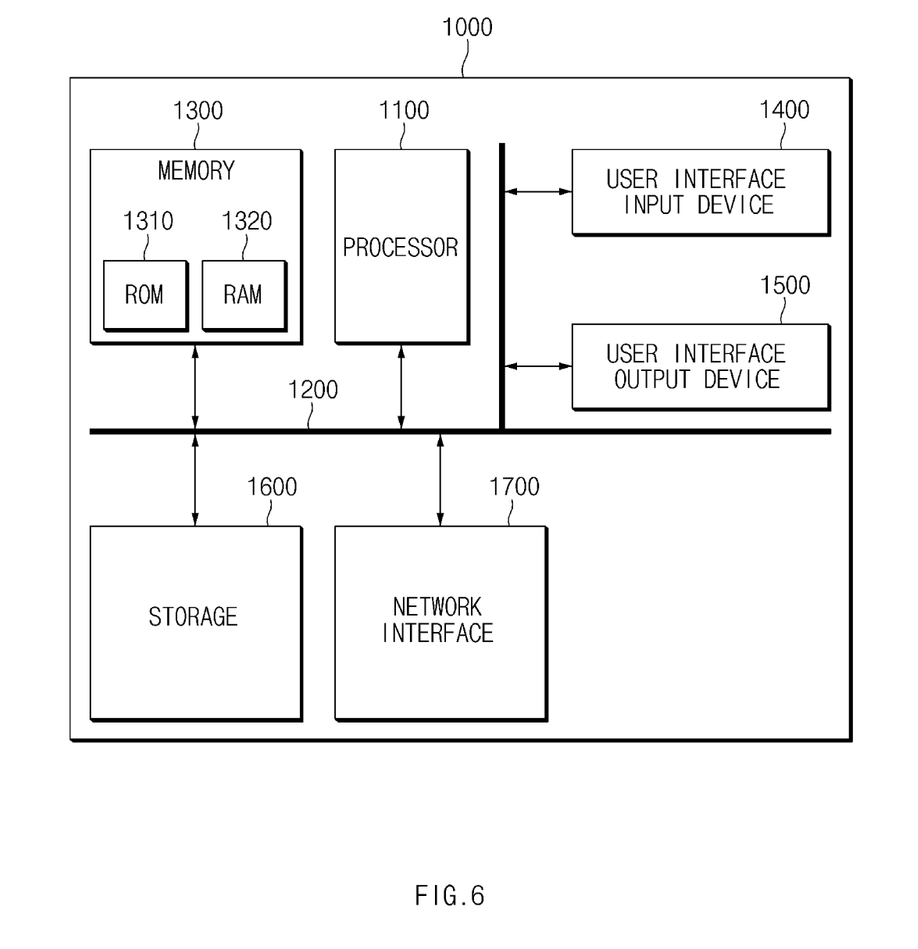
FIG. 6 is a block diagram illustrating a computing system to execute the method according to an embodiment of the present disclosure.

FIG. 6 is a block diagram illustrating a computing system to execute the method according to an embodiment of the present disclosure.

Referring to FIG. 6, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) 1310 and a random access memory (RAM) 1320.

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to an embodiment of the present disclosure, in the apparatus and the method for controlling the wireless charger 170 for the vehicle 100, the charging performance of the wireless charger 170 may be enhanced while minimizing the feeling of the user bothered due to the operating noise of the cooling fan 140 of the wireless charger 170, by setting the driving duty ratio of the cooling fan 140 depending on a personal characteristic, setting the driving duty ratio of the cooling fan 140 through an auto-tuning operation, and setting the driving duty ratio of the cooling fan 170 depending on the type of the vehicle 100.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be construed by the attached claims, and all equivalents thereof should be construed as being included within the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling a wireless charger for a vehicle, the apparatus comprising:
    a communication device configured to receive an input from a user and information on the vehicle; and
    a controller configured to employ one of a first driving duty ratio of a cooling fan set based on the information on the vehicle, a second driving duty ratio of the cooling fan set based on the input from the user, or a third driving duty ratio of the cooling fan set through an auto-tuning operation, to operate the cooling fan;
    wherein the input from the user includes a driving duty ratio of the cooling fan set based on a noise limit allowed by the user; and
    wherein the controller is further configured to:
        generate a message for requesting a user response, which is associated with whether to employ the driving duty ratio of the cooling fan at a time point, at which a level of the noise becomes a preset reference noise level; and
        operate the cooling fan, when the vehicle is actually started after being in a remote starting state; and
    wherein the noise includes a noise changed depending on the auto-tuning operation for a driving duty of the cooling fan.

2. The apparatus of claim 1, wherein the controller is configured to:
    set the first driving duty ratio, depending on an engine type of the vehicle and a vehicle speed, based on noise generated depending on the engine type of the vehicle and the vehicle speed, when receiving the information on the vehicle; and
    employ the first driving duty ratio to operate the cooling fan.

3. The apparatus of claim 1, wherein the controller is configured to:
    set the second driving duty ratio by changing the first driving duty ratio, based on the input from the user, when receiving the input from the user; and
    employ the second driving duty ratio to operate the cooling fan.

4. The apparatus of claim 1, wherein noise changed through the auto-tuning operation for the first driving duty ratio is measured, when the second driving duty ratio is not set;
    wherein a driving duty ratio obtained at a time point, at which a level of the noise becomes a preset reference noise level, is set as the third driving duty ratio; and
    wherein the third driving duty ratio is employed to operate the cooling fan.

5. The apparatus of claim 1, wherein the controller is configured to:
    measure the noise changed depending on the auto-tuning operation for the driving duty ratio of the cooling fan, when the vehicle is in a remote starting state; and
    collect noise data changed depending on the auto-tuning operation for the driving duty ratio of the cooling fan, when the vehicle is in the remote starting state.

6. The apparatus of claim 1, wherein the controller is configured to:
    set, to the third driving duty ratio, the driving duty ratio of the cooling fan, which is obtained at the time point at which the level of the noise becomes the preset reference noise level, when receiving the user response to allow the driving duty ratio of the cooling fan, which is obtained at the time point at which the level of the noise becomes the preset reference noise level, to operate the cooling fan; and
    employ the third driving duty ratio to operate the cooling fan.

7. The apparatus of claim 6, wherein the controller is configured to:
    employ the first driving duty ratio to operate the cooling fan, when receiving a user response to prevent the driving duty ratio of the cooling fan, which is obtained at the time point at which the level of the noise becomes the preset reference noise level, from being employed to operate the cooling fan.

8. The apparatus of claim 1, wherein the controller is configured to:
    operate the cooling fan to dissipate heat emitted from a wireless charging pad.

9. A method for controlling a wireless charger for a vehicle, the method comprising:
    receiving an input from a user and information on the vehicle; and
    employing one of a first driving duty ratio of a cooling fan set based on the information on the vehicle, a second driving duty ratio of the cooling fan set based on the input from the user, or a third driving duty ratio of the cooling fan set through an auto-tuning operation, to operate the cooling fan;
    wherein the input from the user includes a driving duty ratio of the cooling fan set based on a noise limit allowed by the user;
    generating a message for requesting a user response, which is associated with whether to employ the driving duty ratio of the cooling fan at a time point, at which a level of the noise becomes a preset reference noise level; and
    operate the cooling fan, when the vehicle is actually started after being in a remote starting state;

wherein the noise includes a noise changed depending on the auto-tuning operation for a driving duty of the cooling fan.

10. The method of claim 9, further comprising:

setting the first driving duty ratio depending on an engine type of the vehicle and a vehicle speed, based on noise caused depending on the engine type of the vehicle and the vehicle speed, when receiving information on the vehicle, and employing the first driving duty ratio to operate the cooling fan.

11. The method of claim 9, further comprising:

setting the second driving duty ratio by changing the first driving duty ratio, based on the input from the user, when receiving the input from the user; and employing the second driving duty ratio to operate the cooling fan.

12. The method of claim 9, wherein noise changed through the auto-tuning operation for the first driving duty ratio is measured, when the second driving duty ratio is not set, wherein a driving duty ratio obtained at a time point, at which a level of the noise becomes a preset reference noise level, is set as the third driving duty ratio, and wherein the third driving duty ratio is employed to operate the cooling fan.

13. The method of claim 9, further comprising:

measuring the noise changed depending on the auto-tuning operation for the driving duty ratio of the cooling fan, when the vehicle is in a remote starting state; and collecting noise data changed depending on the auto-tuning operation for the driving duty ratio of the cooling fan, when the vehicle is in the remote starting state.

14. The method of claim 9, further comprising:

setting, to the third driving duty ratio, the driving duty ratio of the cooling fan, which is obtained at the time point at which the level of the noise becomes the preset reference noise level, when receiving the user response to allow the driving duty ratio of the cooling fan, which is obtained at the time point at which the level of the noise becomes the preset reference noise level, to operate the cooling fan; and employing the third driving duty ratio to operate the cooling fan.

15. The method of claim 14, further comprising:

employing the first driving duty ratio to operate the cooling fan, when receiving a user response to prevent the driving duty ratio of the cooling fan, which is obtained at the time point at which the level of the noise becomes the preset reference noise level, from being employed to operate the cooling fan.

16. The method of claim 9, wherein the cooling fan is operated to dissipate heat emitted from a wireless charging pad.

* * * * *